(12) United States Patent
Takeda et al.

(10) Patent No.: US 8,327,824 B2
(45) Date of Patent: Dec. 11, 2012

(54) AIR-INTAKE APPARATUS OF INTERNAL COMBUSTION ENGINE

(75) Inventors: Tetsuma Takeda, Kariya (JP); Ryo Sano, Kariya (JP)

(73) Assignee: Denso Corporation, Kariya (JP)

( * ) Notice: Subject to any disclaimer, the term of this patent is extended or adjusted under 35 U.S.C. 154(b) by 126 days.

(21) Appl. No.: 13/079,904

(22) Filed: Apr. 5, 2011

(65) Prior Publication Data

US 2011/0239975 A1    Oct. 6, 2011

(30) Foreign Application Priority Data

Apr. 6, 2010   (JP) .................................. 2010-087677

(51) Int. Cl.
*F02D 9/10* (2006.01)

(52) U.S. Cl. ......... 123/306; 123/308; 123/336; 123/337

(58) Field of Classification Search .................. 123/306, 123/308, 336, 337
See application file for complete search history.

(56) References Cited

U.S. PATENT DOCUMENTS

| | | | |
|---|---|---|---|
| 5,875,758 A * | 3/1999 | Fujita | 123/336 |
| 6,895,926 B1 * | 5/2005 | Moreau et al. | 123/336 |
| 7,219,652 B2 * | 5/2007 | Ino et al. | 123/337 |
| 7,353,801 B2 * | 4/2008 | Winkelmuller et al. | 123/336 |
| 8,015,959 B2 * | 9/2011 | Jeon | 123/184.56 |
| 8,082,900 B2 * | 12/2011 | Germain et al. | 123/336 |
| 8,191,861 B2 * | 6/2012 | Elsasser et al. | 251/306 |

FOREIGN PATENT DOCUMENTS

| | | |
|---|---|---|
| JP | S63-118335 | 7/1988 |
| JP | S64-024129 | 1/1989 |
| JP | H3-35235 | 4/1991 |
| JP | P2004-251238 A | 9/2004 |
| JP | 2006-161885 | 6/2006 |
| JP | P2008-128186 A | 6/2008 |

OTHER PUBLICATIONS

Japanese Office Action dated Feb. 28, 2012, issued in corresponding Japanese Application No. 2010-087677 with English Translation.

* cited by examiner

*Primary Examiner* — Erick Solis

(74) *Attorney, Agent, or Firm* — Nixon & Vanderhye, PC

(57) ABSTRACT

An inner ring of a bearing is fixed to an outer periphery of a central portion of a shaft between a pair of facing sections. An outer ring of the bearing is fixed to a hole wall surface of a shaft accommodation recess. A spring is accommodated between one of the pair of facing sections and the bearing in a state where the spring is compressed in a rotational axis direction of a pin rod for pressing the bearing against the other one of the pair of facing sections. Thus, defects such as galling or friction between a casing and rotary valves can be inhibited. Accordingly, occurrence of wear or an abnormal noise between the casing and the rotary valves can be inhibited.

15 Claims, 13 Drawing Sheets

AIR-INTAKE APPARATUS OF INTERNAL COMBUSTION ENGINE

CROSS REFERENCE TO RELATED APPLICATION

This application is based on and incorporates herein by reference Japanese Patent Application No. 2010-87677 filed on Apr. 6, 2010.

BACKGROUND OF THE INVENTION

1. Field of the Invention

The present invention relates to an air-intake apparatus of a multi-cylinder internal combustion engine having an intake air control valve for controlling intake air suctioned into combustion chambers of respective cylinders of the engine. Specifically, the present invention relates to an air-intake apparatus of an internal combustion engine that generates rotational flows (intake air vortex flows) in combustion chambers of respective cylinders of the engine to improve combustion efficiency.

2. Description of Related Art

Conventionally, there has been known an air-intake apparatus of an internal combustion engine having a tumble flow control valve (TCV) and a variable intake air control valve (ACISV). The tumble flow control valve generates a tumble flow in a longitudinal direction in a combustion chamber of each cylinder of the internal combustion engine (four-cylinder engine) to improve combustion efficiency in the combustion chamber. Thus, improvement of fuel consumption or emission (e.g., HC reduction effect) is aimed. The variable intake air control valve varies intake passage length (intake pipe length) of the four-cylinder engine to effectively utilize an inertial supercharging effect, thereby improving an output of the four-cylinder engine (for example, refer to Patent document 1: JP-A-2006-161885).

The tumble flow control valve has four valves as valve members, a single shaft for supporting the valves, multiple bushings for rotatably supporting the shaft, and the like.

As shown in FIGS. 13A and 13B, the variable intake air control valve has four valves 102 for opening and closing multiple intake passages formed in an intake manifold 101 respectively, a shaft 103 for supporting and fixing the valves 102, multiple shaft bushings for rotatably supporting the shaft 103, and the like.

The shaft 103 has an annular protrusion 104 (i.e., annular flange) protruding radially in the shape of a flange.

The shaft bushing is composed of a fixed bushing half body 111 and a movable bushing half body 112. The fixed bushing half body 111 is fixed to the intake manifold 101. The movable bushing half body 112 rotatably supports the shaft 103 in combination with the fixed bushing half body 111. The movable bushing half body 112 is provided such that the movable bushing half body 112 can be displaced freely in the radial direction of the shaft 103. Annular grooves 113, 114 for accommodating the annular protrusion 104 are formed in the fixed bushing half body 111 and the movable bushing half body 112.

The shaft bushing described in Patent document 1 supports the shaft 103 such that the shaft 103 can rotate smoothly. At the same time, the annular protrusion 104 of the shaft 103 restricts displacement of the shaft 103 in a thrust direction in combination with the annular grooves 113, 114 of the fixed bushing half body 111 and the movable bushing half body 112.

The air-intake apparatus of the internal combustion engine described in Patent document 1 is assembled by loosely inserting the annular protrusion 104 of the shaft 103 into the annular grooves 113, 114 of the shaft bushing (fixed bushing half body 111 and movable bushing half body 112). Therefore, backlash arises in the thrust direction of the shaft 103 inevitably.

A clearance (e.g., side clearance) is formed between a passage wall surface of the intake manifold 101 and a side surface (outer peripheral surface) of each valve 102 in order to suppress increase of sliding resistance (sliding torque) of the valve 102. There is a possibility that a dimensional change arises in the clearance because of a difference between linear expansion coefficients of the intake manifold 101 and the shaft 103, i.e., because of temperature change. Accordingly, galling or friction can arise between the passage wall surface of the intake manifold 101 and the side surface (outer peripheral surface) of the valve 102. As a result, there can occur a problem that the intake manifold 101 and the valves 102 wear or generate a hammering sound (abnormal noise).

There is a possibility that backlash occurs in a rotational axis direction (i.e., thrust direction) of the shaft 103, which links the multiple valves 102 such that the valves 102 can move in conjunction with each other. Therefore, positions of the four valves 102, which are arranged for the respective cylinders of the four-cylinder engine correspondingly, in the thrust direction cannot be decided correctly. Accordingly, when the four valves 102 are fully closed, a variation arises among flow rates of leak air passing through clearances (gaps) on both sides of the valves 102 with respect to the rotational axis direction. Therefore, there is a problem that aimed performance (i.e., effect to improve engine output) cannot be achieved.

When the shaft bushing (fixed bushing half body 111 and movable bushing half body 112) described in Patent document 1 is applied to a tumble flow control valve, a variation arises among flow rates of leak air flowing from circumferences of the valves. Accordingly, generation of the rotational flows (tumble flows) in the combustion chambers of the four-cylinder engine becomes unstable. Therefore, there is a problem that aimed performance (e.g., effect to improve combustion efficiency of four-cylinder engine or effect to improve fuel consumption through stabilization of combustion) cannot be achieved.

SUMMARY OF THE INVENTION

It is an object of the present invention to provide an air-intake apparatus of an internal combustion engine capable of restricting displacement of a shaft in a rotational axis direction of the shaft. It is another object of the present invention to provide an air-intake apparatus of an internal combustion engine capable of reducing a dimensional change of a clearance between a casing and each valve accompanying temperature change. It is a further object of the present invention to provide an air-intake apparatus of an internal combustion engine capable of absorbing backlash of the shaft in the rotational axis direction of the shaft.

According to a first example aspect of the present invention, an air-intake apparatus of an internal combustion engine having a plurality of cylinders has a casing defining a plurality of intake passages for supplying intake air to the cylinders of the internal combustion engine respectively. A plurality of valves are accommodated in the intake passages of the casing respectively such that the valves can open and close freely (i.e., rotate freely). The plurality of valves are connected by a shaft (e.g., single shaft extending in rotational axis direction thereof) such that the valves can move in conjunction with each other. A thrust restriction section for restricting displacement of the shaft in the rotational axis direction is constituted by a pair of facing sections, a rolling bearing and a bearing pressing section.

The pair of facing sections are formed integrally with the casing, for example. The pair of facing sections are arranged to face each other across an axial distance (accommodation space) parallel to the rotational axis direction of the shaft.

The rolling bearing is arranged between the pair of facing sections. An inner ring of the rolling bearing is fixed (press-fitted) to an outer periphery of the shaft between the facing sections.

The bearing pressing section is arranged between one of the pair of facing sections and the rolling bearing. The bearing pressing section presses the rolling bearing against the other one of the pair of facing sections. The bearing pressing section may be a compression spring in the shape of a coil.

In this way, the rolling bearing, which has the inner ring fixed to the outer periphery of the shaft, and the bearing pressing section, which presses the rolling bearing against the other one of the pair of facing sections, are arranged between the pair of facing sections (i.e., in space having axial distance). Thus, displacement of the shaft in the rotational axis direction (thrust direction) can be inhibited. Accordingly, defects such as galling or friction between the casing (or facing wall surfaces or passage wall surfaces of casing) and the rotary valves (or outside surfaces or outer peripheral surfaces of rotary valves) can be inhibited. As a result, occurrence of wear or an abnormal noise between the casing (or facing wall surfaces or passage wall surfaces of casing) and the rotary valves (or outside surfaces or outer peripheral surfaces of rotary valves) can be inhibited.

The displacement of the shaft, which connects the multiple valves such that the valves can move in conjunction with each other, in the rotational axis direction (i.e., thrust direction) can be inhibited. Thus, dimensional changes of clearances between the casing (or facing wall surfaces or passage wall surfaces of casing) and the valves (or outside surfaces or outer peripheral surfaces of rotary valves) accompanying temperature change can be reduced. Positioning of the shaft in the rotational axis direction (thrust direction) with respect to the casing can be performed accurately. Accordingly, the clearances between the casing (or facing wall surfaces or passage wall surfaces of casing) and the valves (or outside surfaces or outer peripheral surfaces of rotary valves) can be made suitable.

Thus, in a case where the intake air control valve having the casing, the valves and the shaft is used as an air flow rate control valve (throttle valve) that controls flow rates of intake air suctioned into the respective cylinders of the internal combustion engine, a variation among flow rates of leak air passing through both clearances on both sides of the respective valves with respect to the rotational axis direction can be reduced when the valves are fully closed. As a result, aimed performance (effect to improve output of internal combustion engine) can be achieved.

In a case where the intake air control valve having the casing, the valves and the shaft is used as an air flow control valve (tumble flow control valve) that generates rotational flows (intake air vortex flows) in the combustion chambers of the respective cylinders of the internal combustion engine, a variation among the flow rates of the leak air from circumferences of the valves can be reduced. Therefore, generation of the rotational flows in the combustion chambers of the respective cylinders of the internal combustion engine can be stabilized. Accordingly, aimed performance (effect to improve combustion efficiency of internal combustion engine or effect to improve fuel consumption through stabilization of combustion) can be achieved.

The bearing pressing section may be a coil spring arranged to spirally surround a periphery of the shaft.

According to a second example aspect of the present invention, the casing has a U-shaped recess that opens outward in a radial direction of the shaft and that extends from the opening side to a deeper side opposite to the opening side.

According to a third example aspect of the present invention, the casing has a recess that extends in the rotational axis direction parallel to the shaft.

According to a fourth example aspect of the present invention, the shaft is arranged (accommodated) such that the shaft penetrates through the recess in the rotational axis direction of the shaft.

Thus, by inserting the shaft from the opening side toward the deeper side of the recess, the shaft can be accommodated such that the shaft penetrates through the recess of the casing.

According to a fifth example aspect of the present invention, the bearing pressing section is a spring in the shape of a coil accommodated between the one of the pair of facing sections and the rolling bearing in a state where the spring is compressed in the rotational axis direction of the shaft.

The spring exerts a biasing force to extend toward both sides along the rotational axis direction of the shaft (thrust direction). That is, the spring presses the rolling bearing against the other one of the pair of facing sections.

Since the coil spring is accommodated between the one of the pair of facing sections and the rolling bearing in the state where the spring is compressed in the rotational axis direction of the shaft, the displacement of the shaft in the rotational axis direction (thrust direction) can be inhibited. Moreover, backlash of the multiple valves and the shaft in the rotational axis direction (thrust direction) can be absorbed. Accordingly, the defects such as the galling or friction between the casing and the valves can be inhibited. As a result, occurrence of wear or an abnormal noise between the casing and the valves can be inhibited.

According to a sixth example aspect of the present invention, an outer ring of the rolling bearing is fixed to a wall surface of the casing between the pair of facing sections.

According to a seventh example aspect of the present invention, the rolling bearing has a plurality of rolling elements that are accommodated between two bearing rings of the inner ring and the outer ring and that roll between orbital surfaces of the inner ring and the outer ring.

Accordingly, the rolling bearing rotatably supports the shaft inside the casing.

According to an eighth example aspect of the present invention, a cross-section of the shaft perpendicular to the rotational axis direction of the shaft is formed in a polygonal shape.

According to a ninth example aspect of the present invention, the air-intake apparatus further has a resin member arranged to surround a periphery of the shaft in a circumferential direction.

According to a tenth example aspect of the present invention, the air-intake apparatus further has a pipe (cylinder) that is provided on an outer peripheral portion of the resin member by insert molding and that is press-fitted with the inner ring of the rolling bearing.

Thus, even if the cross-section of the shaft perpendicular to the rotational axis direction has the polygonal shape, the shaft can be easily rotated relative to the casing. Therefore, failure of operation of the multiple valves and the shaft can be inhibited.

According to an eleventh example aspect of the present invention, the thrust restriction section has a first collar enabling the bearing pressing section to slide with respect to the one of the pair of facing sections and a second collar enabling the bearing pressing section to slide with respect to the rolling bearing.

Thus, increase of sliding resistance (sliding torque) of the multiple valves and the shaft with respect to the casing in the rotational direction can be inhibited. As a result, failure of operation of the multiple valves and the shaft can be inhibited.

According to a twelfth example aspect of the present invention, a central portion of the shaft with respect to the rotational axis direction of the shaft is arranged between the pair of facing sections, which are components constituting the thrust restriction section (and which are formed integrally with casing, for example).

According to a thirteenth example aspect of the present invention, the inner ring of the rolling bearing is fixed to an outer periphery of the central portion of the shaft with respect to the rotational axis direction of the shaft.

According to a fourteenth example aspect of the present invention, the bearing pressing section is a spring in the shape of a coil arranged to spirally surround the central portion of the shaft with respect to the rotational axis direction of the shaft.

Thus, the rolling bearing and the bearing pressing section (coil spring) as the thrust restriction section are arranged near the central portion of the shaft with respect to the rotational axis direction of the shaft. Accordingly, an amount of backlash of the valve, which is supported by the shaft at the farthest position from the thrust restriction section, in the rotational axis direction of the valve (thrust direction) can be reduced as compared to the case where the thrust restriction section is arranged on an end portion of the shaft with respect to the rotational axis direction of the shaft.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Hereinafter, embodiments of the present invention will be described with reference to the drawings.

The present invention achieves an object to inhibit displacement of a shaft in a rotational axis direction of the shaft, an object to reduce dimensional changes of clearances between a passage wall surface of a casing and side surfaces (outer peripheral surfaces) of respective valves and an object to absorb backlash of the shaft in the rotational axis direction of the shaft by arranging a coil-shaped spring (bearing pressing section) between one of pair of facing sections and a rolling bearing, which has an inner ring fixed to an outer periphery of the shaft, for pressing the rolling bearing against the other one of the pair of facing sections.

First Embodiment

Figure 1:
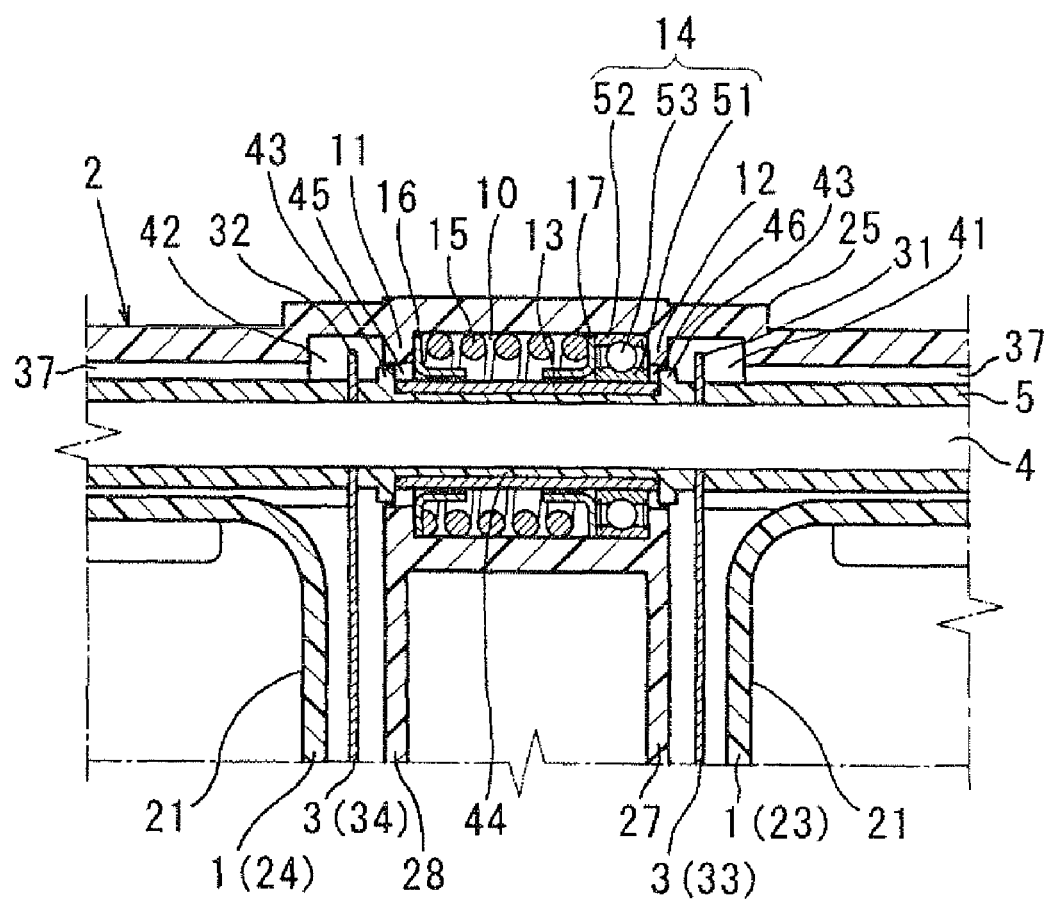
FIG. 1 is a partial cross-sectional view showing a bearing structure of an intake air flow control valve (TCV) according to a first embodiment of the present invention.
Figure 2:
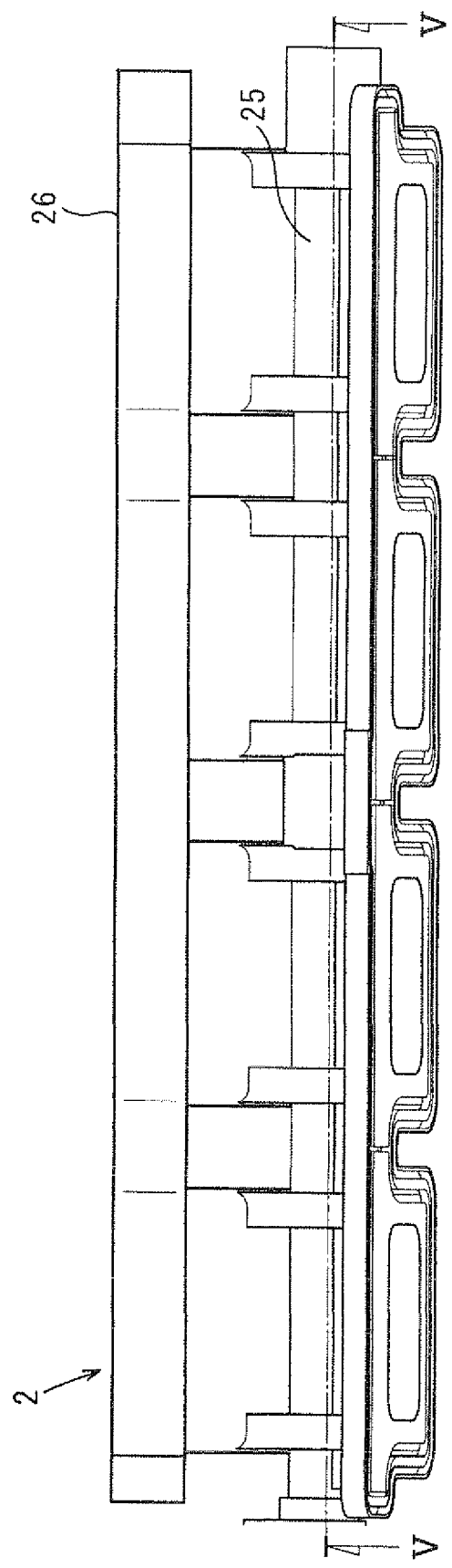
FIG. 2 is a plan view showing an entire structure of the intake air flow control valve (TCV) according to the first embodiment.
Figure 3:
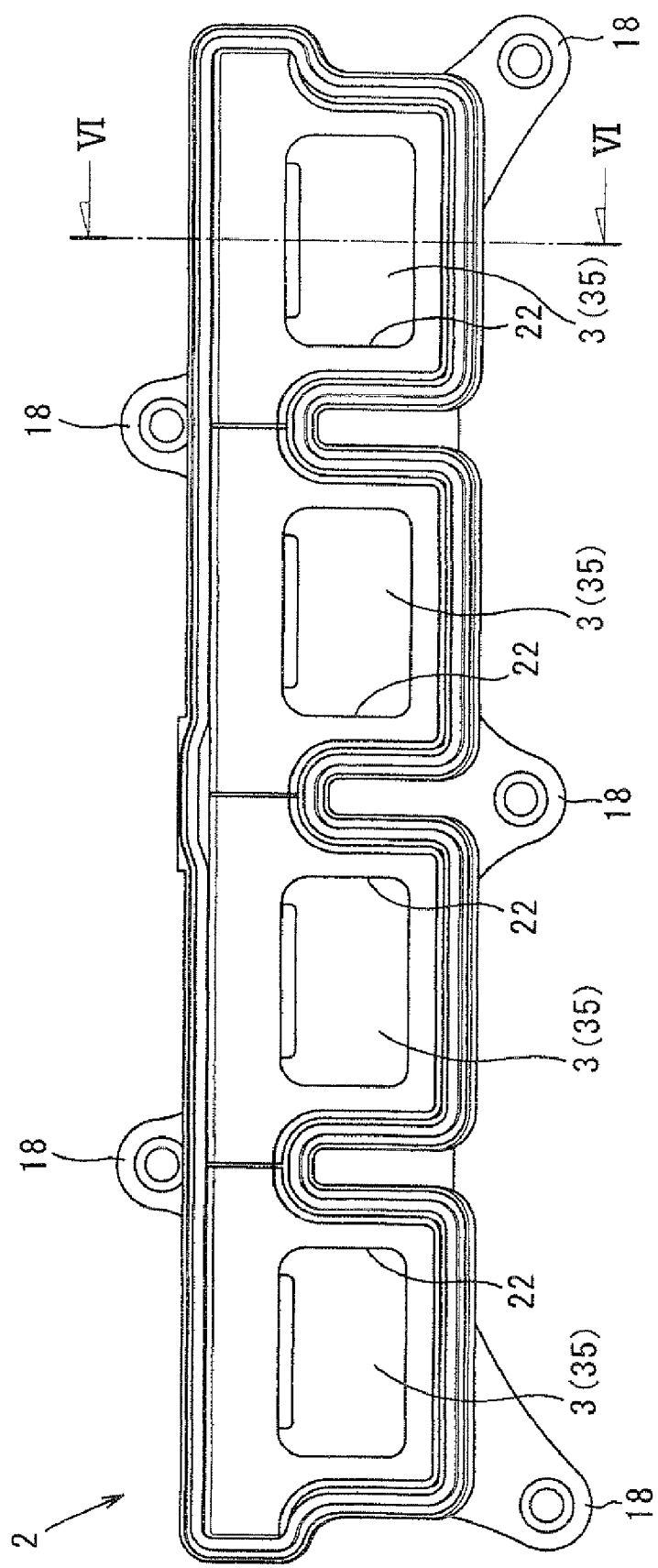
FIG. 3 is a front view showing the entire structure of the intake air flow control valve (TCV) according to the first embodiment.
Figure 4:
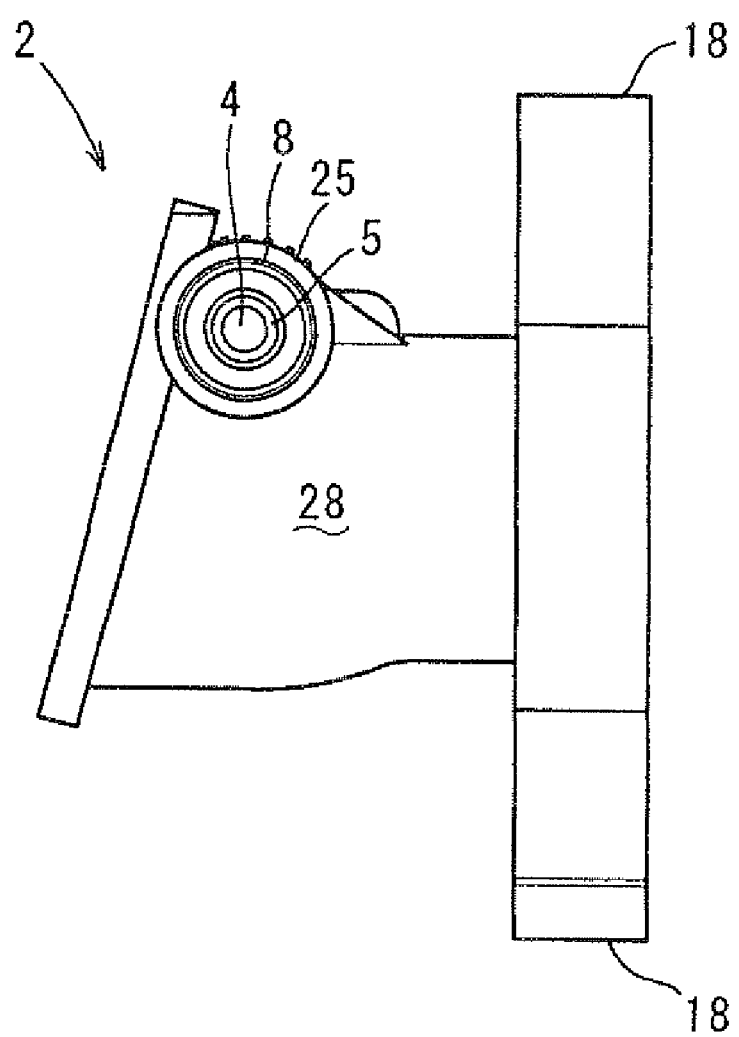
FIG. 4 is a side view showing the entire structure of the intake air flow control valve (TCV) according to the first embodiment.
Figure 5:
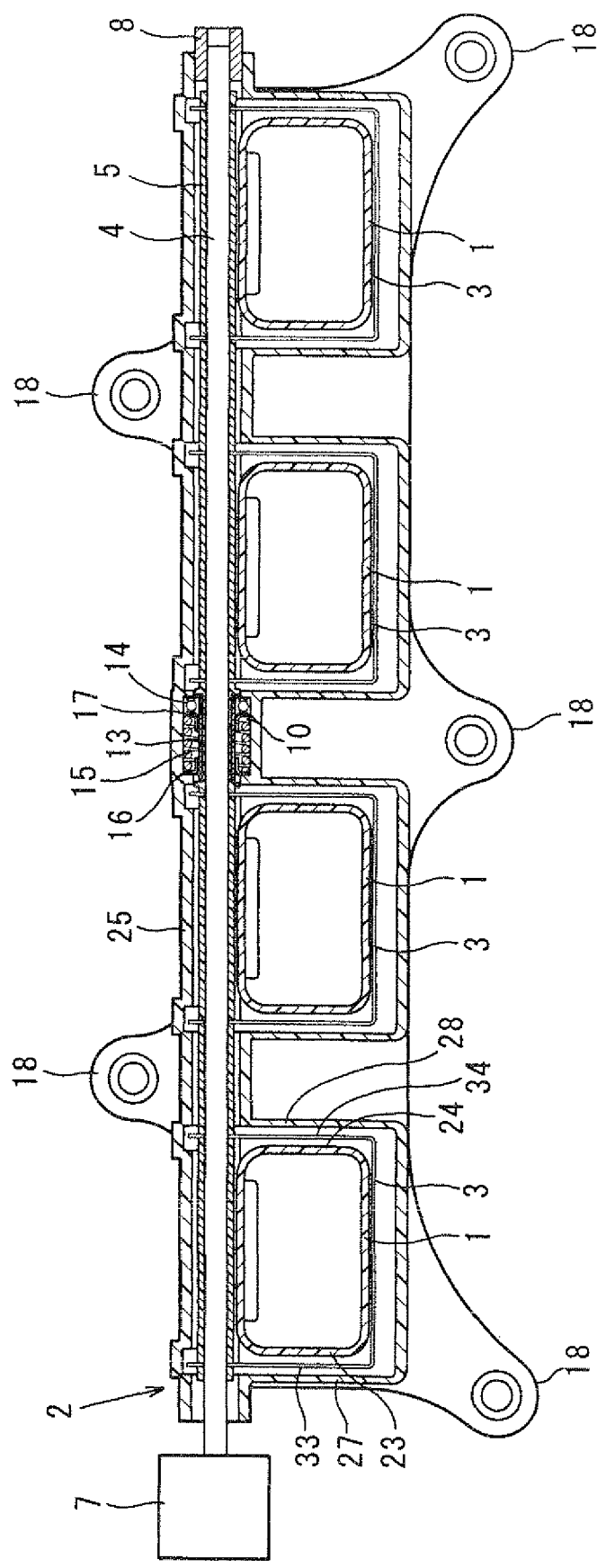
FIG. 5 is a cross-sectional view showing the intake air flow control valve of FIG. 2 taken along the line V-V.
Figure 6:
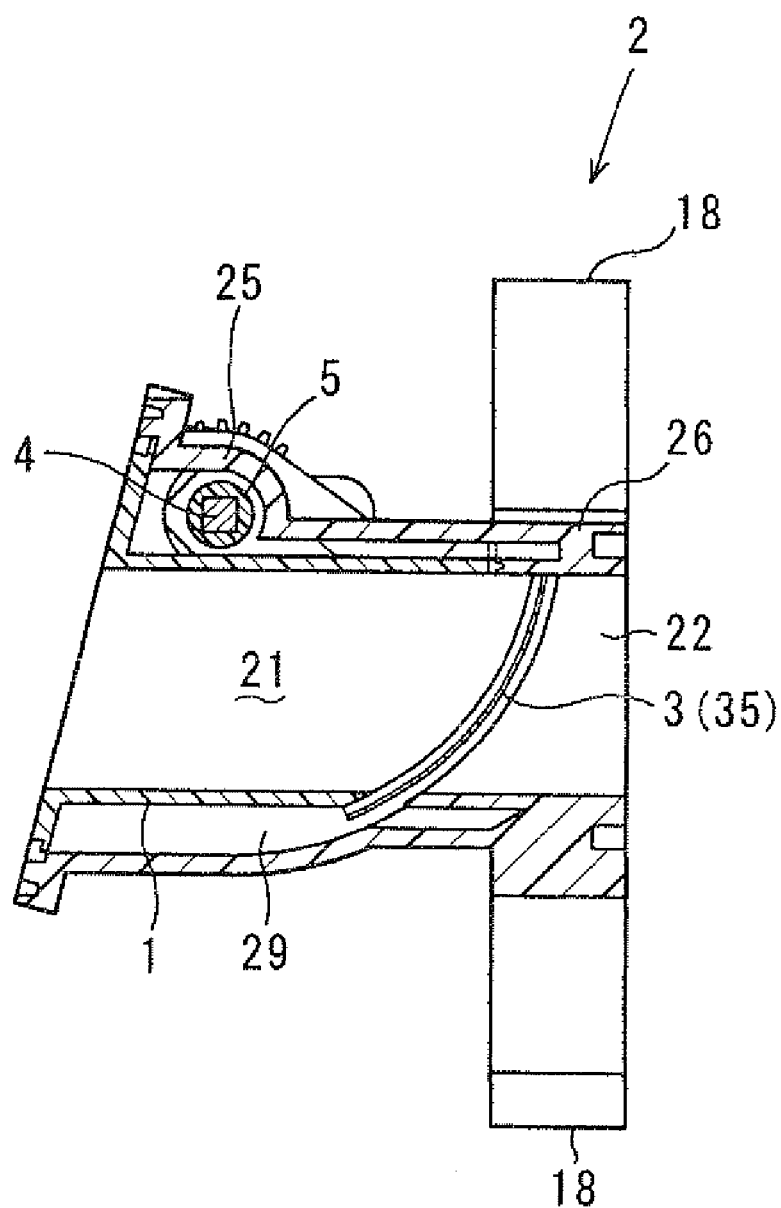
FIG. 6 is a cross-sectional view showing the intake air flow control valve of FIG. 3 taken along the line VI-VI.
Figure 7:
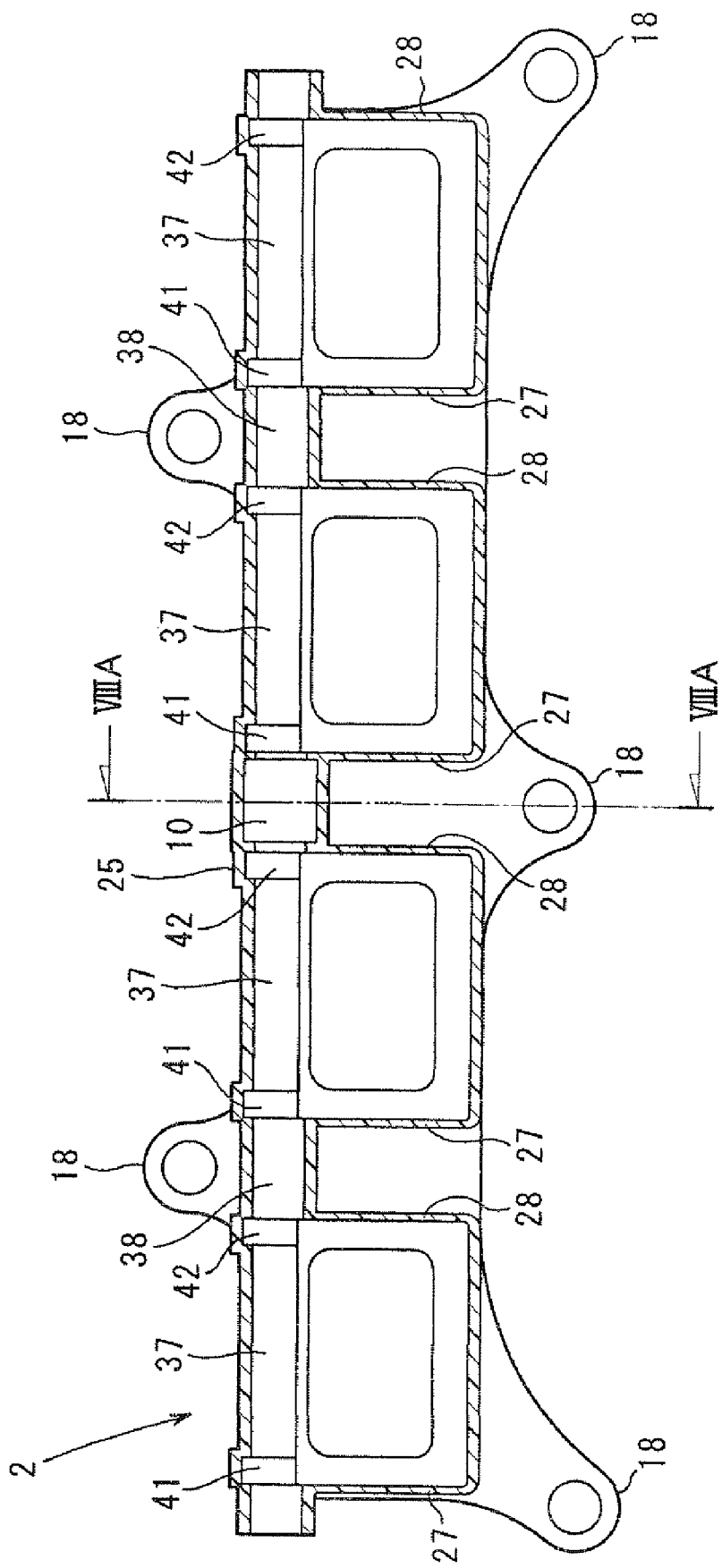
FIG. 7 is a front view showing an intake manifold (casing) according to the first embodiment.
Figure 8A:
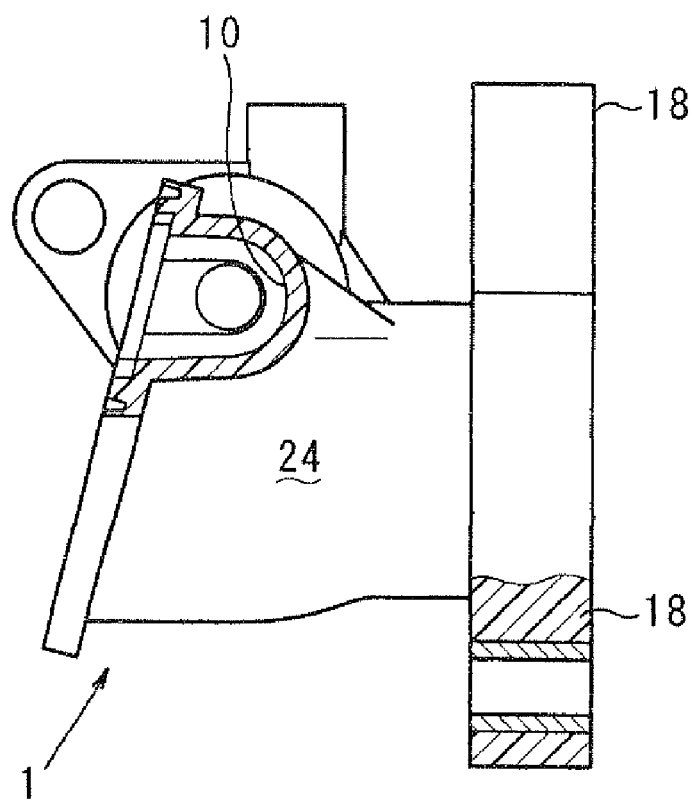
FIG. 8A is a cross-sectional view showing the intake manifold of FIG. 7 taken along the line VIIIA-VIIIA.
Figure 8B:
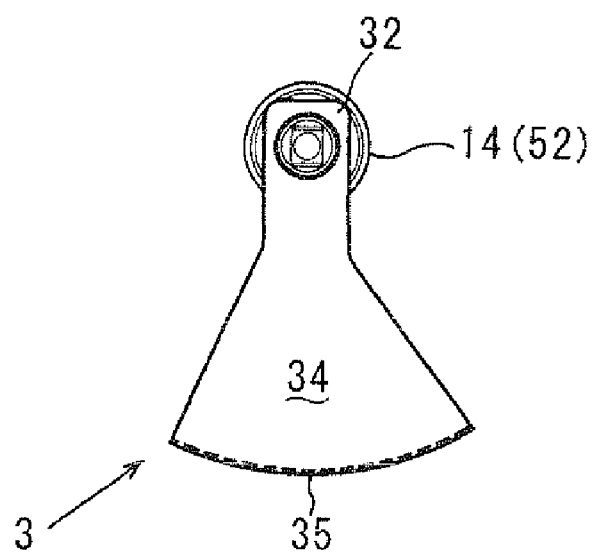
FIG. 8B is a side view showing a valve subassembly according to the first embodiment.

FIGS. 1 to 8B show a first embodiment of the present invention. FIG. 1 is a partial cross-sectional view showing a bearing structure of an intake air flow control valve (TCV) according to the first embodiment. FIGS. 2 to 6 are views each showing an entire structure of the intake air flow control valve (TCV) according to the first embodiment.

An air-intake apparatus of an internal combustion engine according to the present embodiment has multiple intake passages for supplying intake air to respective cylinders of an internal combustion engine (in-line four-cylinder engine) having multiple cylinders. The air-intake apparatus has an intake passage structure, in which the multiple intake passages are arranged in parallel to each other along an arrangement direction of the cylinders of the engine. The air-intake apparatus has an air cleaner, an electronic control throttle device, an intake air rotational flow generator and the like.

The electronic control throttle device is a system that variably controls a flow rate (intake air quantity) of the intake air suctioned into combustion chambers of the cylinders of the engine in accordance with a throttle opening equivalent to a valve opening of a throttle valve (not shown).

The intake air rotational flow generator is arranged in an engine compartment of a vehicle such as an automobile. The intake air rotational flow generator is a system that restricts intake passage cross-sectional areas of the multiple intake passages (independent intake passages), which are arranged parallel to each other. Thus, the intake air rotational flow generator generates a rotational flow (intake air vortex flow, tumble flow) in a longitudinal direction in the combustion chamber of each cylinder of the engine.

The intake air rotational flow generator is built in an air intake system of the engine together with the electronic control throttle device. The intake air rotational flow generator is a valve opening-closing device of a multiple unit integral type, in which multiple TCVs (valve units) are arranged in parallel at constant intervals along a rotational axis direction of a pin rod 4 inside an intake manifold.

The intake air rotational flow generator has multiple intake air flow control valves (tumble flow control valves: TCVs), each of which generates a rotational flow (intake air vortex flow, tumble flow) in a longitudinal direction in the combustion chamber of each cylinder of the engine. The intake air rotational flow generator has a duct 1 made of a synthetic resin, into which the intake air flows from a throttle body or a surge tank via an upstream end portion of the intake manifold. The intake air rotational flow generator has a casing 2 (downstream end portion of intake manifold), which is made of a synthetic resin and which is arranged to surround a periphery of the duct 1.

The intake air rotational flow generator has rotary valves 3 (multiple valves), the pin rod 4, a resin mold member 5 (shaft made of synthetic resin), a thrust restriction mechanism (thrust restriction section), an actuator 7 and an engine control unit (ECU). The rotary valves 3 are made of a metal and are accommodated in the casing 2 such that the rotary valves 3 can open and close freely, i.e., rotate freely. The pin rod 4 is made of a metal and links the multiple rotary valves 3 such that the rotary valves 3 can move in conjunction with each other. The resin mold member 5 covers a periphery of the pin rod 4 entirely. The thrust restriction mechanism absorbs backlash of the pin rod 4 with respect to the casing 2 in a rotational axis direction (i.e., in thrust direction) of the pin rod 4. In addition, the thrust restriction mechanism restricts displacement of the pin rod 4 with respect to the casing 2 in the rotational axis direction (i.e., in thrust direction) of the pin rod 4. The actuator 7 can collectively change valve openings (or rotation angles) of the multiple TCVs via the pin rod 4. The ECU controls the valve openings of the multiple TCVs in connection with systems such as the electronic control throttle device, ignition devices and fuel injection devices.

The actuator 7 according to the present embodiment has a motor (not shown), which receives supply of an electric power and generates a driving force, a power transmission mechanism (i.e., gear reducer mechanism) for transmitting the driving force of the motor to the pin rod 4, and the like. The gear reducer mechanism may be constructed of a double-reduction gear mechanism consisting of a motor gear (pinion gear) fixed to a motor shaft of the motor, an intermediate reduction gear meshed with the motor gear, a final reduction gear meshed with the intermediate reduction gear and the like.

The actuator 7 can support and fix the multiple rotary valves 3 through the pin rod 4 and the shaft 5. Thus, the actuator 7 can collectively change the openings of the multiple rotary valves 3 (i.e., valve openings of TCVs).

The motor, which drives the multiple rotary valves 3, is electrically connected to a battery mounted in the vehicle through a motor drive circuit, which is electronically controlled by the ECU.

The thrust restriction mechanism (i.e., bearing structure of TCV) has the pin rod 4, a pair of facing sections 11, 12, a bearing support pipe 13 (bearing (inner ring) support section), a bearing 14, a spring 15 in the shape of a coil, and first and second collars 16, 17. The facing sections 11, 12 are arranged to face each other across an axial distance (i.e., U-shaped shaft accommodation recess 10) parallel to a rotational axis direction of the shaft 5. The bearing support pipe 13 is formed on an outer periphery of a central portion of the shaft 5 with respect to the rotational axis direction by insert molding (outsert molding). The bearing 14 is fitted between an outer peripheral surface of the bearing support pipe 13 and a hole wall surface of a bearing hole (i.e., bearing (outer ring) support section) of the casing 2. The spring 15 is arranged to spirally surround peripheries of central portions of the pin rod 4 and the shaft 5 with respect to the rotational axis direction. The first and second collars 16, 17 are arranged on both sides of the spring 15 respectively to enable the spring 15 to move in a sliding manner.

The engine is a gasoline engine for generating an output by using a thermal energy obtained by combusting a mixture gas of clean intake air filtered by an air cleaner (air cleaner of internal combustion engine) and fuel injected from the injectors in the combustion chambers of the respective cylinders.

The engine has a cylinder block and a cylinder head. The cylinder block has multiple cylinders (first to fourth cylinders), which are arranged in line in the cylinder arrangement direction. The cylinder head has multiple intake ports and multiple exhaust ports.

Four combustion chambers are formed in the cylinder block of the engine along the cylinder arrangement direction. Pistons connected with a crankshaft via connecting rods are slidably supported in cylinder bores, which are formed in the respective cylinders of the cylinder block, along sliding directions of the pistons.

Intake pipes (intake ducts) and exhaust pipes (exhaust ducts) are connected to the cylinder head of the engine. The intake pipe is for introducing the intake air into the combustion chamber of each cylinder of the engine. The exhaust pipe is for discharging exhaust gas, which flows out from the combustion chamber of each cylinder of the engine, to an outside via an exhaust gas purification device.

The cylinder head of the engine has a connection end surface (fastening surface) for connecting and fixing connection flanges 18 of the casing 2 by using fastening bolts. The cylinder head has sparkplugs, tip ends of which are exposed into the combustion chambers of the respective cylinders. The injectors (electromagnetic fuel injectors) for injecting the fuel at optimal timings into the intake ports are fixed to the cylinder head.

The intake port of each cylinder is opened and closed by a poppet intake valve. The exhaust port of each cylinder of the engine is opened and closed by a poppet exhaust valve.

The duct 1 according to the present embodiment is constituted by a member different from the casing 2. The duct 1 is a peripheral wall section formed in the shape of a rectangular tube. The duct 1 is arranged to surround a periphery of an intake passage 21 in a circumferential direction and extends in a duct circumferential direction. The duct 1 is inserted and held in the casing 2.

The intake passage 21 constitutes an independent intake passage (relay flow passage) for leading the intake air, which flows in from each intake passage formed in each of intake air branch pipes in the casing 2, to an intake passage 22.

The duct 1 has left and right walls 23, 24 (facing walls) and upper and lower walls. The facing walls 23, 24 face each other across an axial clearance (hollow section) parallel to the rotational axis direction of the pin rod 4. The upper and lower walls connect the facing walls 23, 24.

A curve line section in the shape of an arc having a curvature radius centering on the rotational axis of the pin rod 4 is provided in a downstream end of the duct 1 with respect to the airflow direction and in opening ends of the facing walls 23, 24.

A fitting protrusion in the shape of a rectangular ring is formed in a downstream end face of the duct 1 with respect to the airflow direction (i.e., opening end face in rectangular tube shape). The fitting protrusion is fitted to a fitting recess in the shape of a rectangular ring formed in the connection end face of the casing 2.

The casing 2 according to the present embodiment constitutes the downstream end portion of the intake manifold that consists of multiple components and that is integrated with a surge tank. The surge tank reduces a pressure pulsation of the intake air. The intake manifold also has multiple intake air branch pipes connected to multiple outlets of the surge tank. All the multiple components are made of a synthetic resin.

The casing 2 is arranged to surround the periphery of the intake passage 22 in the circumferential direction.

The intake passage 22 defines an independent intake passage (blowing flow passage) for blowing the intake air, which flows out from the intake passage 21, to the intake port of each cylinder of the engine.

The multiple intake passages 21, 22 are connected to the combustion chambers of the respective cylinders of the engine through the respective intake ports of the cylinder head independently from each other.

A hollow section for accommodating the corresponding duct 1 and rotary valve 3 is formed upstream of the intake passage 22 of the casing 2 with respect to the intake air flow direction. The numbers of the intake passages 22 and the hollow sections correspond to the number of the cylinders.

A block 25 (shaft bearing) and multiple relay ducts 26 are formed integrally with the casing 2. The block 25 is arranged to surround peripheries of the ducts 1 and the hollow sections in a circumferential direction. The multiple relay ducts 26 are provided to protrude downstream with respect to the intake air flow direction further than the block 25 (i.e., toward cylinder head side).

A partition wall member is provided below the block 25 in FIG. 1. The partition wall member surrounds the peripheries of each duct 1 and each hollow section in a U-shape having angled corners. The partition wall member has left and right walls 27, 28 (facing walls), which face each other across an axial clearance (hollow section) parallel to the rotational axis direction of the pin rod 4, and a lower wall (bottom wall) connecting the facing walls 27, 28.

The intake passage 22 connecting (relaying) the intake passage 21 in each duct 1 and each intake port of the engine is formed in each of the relay ducts 26.

Details of the casing 2 will be explained later.

In the present embodiment, a valve subassembly is constituted by the multiple rotary valves 3 (valve members of TCVs), which are accommodated in the multiple intake passages 21, 22 such that the rotary valves 3 can open and close freely, i.e., rotate freely, and the single pin rod 4 that supports and fixes the rotary valves 3.

Each of the multiple rotary valves 3 is an airflow control valve (swing type rotary valve) in a U-shape having angled corners for generating a rotational flow (intake air vortex flow, tumble flow) in a longitudinal direction in the combustion chamber of each cylinder of the engine.

A rotation angle (valve opening) of each of the multiple rotary valves 3 is changed in an entire valve operation range from a fully-opening position to a fully-closing position. Specifically, when the rotation angle (valve opening) of the rotary valve 3 is changed in the entire valve operation range from the fully-opening position to the fully-closing position, the rotary valve 3 rotates relative to the duct 1 and the casing 2, thereby opening and closing the intake passages 21, 22. That is, the rotary valve 3 can change opening areas (passage cross-sectional areas) of the intake passages 21, 22. The rotary valve 3 according to the present embodiment constitutes a two-position switching valve that switches the position thereof between the fully-opening position for fully opening the intake passages 21, 22 and the fully-closing position for fully closing the intake passages 21, 22.

When each of the multiple rotary valves 3 is opened fully, the rotary valve 3 deviates from the fully-closing position (facing position, fully-closing state) and is brought to an accommodation position (accommodation state), in which the rotary valve 3 opens up the intake passage 21 and is accommodated in a valve accommodation recess 29. At the fully-closing position, the rotary valve 3 is arranged between the downstream end of the duct 1 and the air outlet of the intake passage 21 to face the downstream end of the duct 1 and the air outlet of the intake passage 21 across clearances.

The rotary valves 3 are accommodated in the casing 2 such that the rotary valves 3 can rotate (swing). Each rotary valve 3 has a pair of side plates 33, 34 having two connecting sections 31, 32, which are connected to the pin rod 4, and a valve plate 35 for changing an opening area of the air flow passage communicating with the combustion chamber of each cylinder of the engine.

The two connecting sections 31, 32 are metallic ring plates surrounding the peripheries of the pin rod 4 and the shaft 5. The connecting sections 31, 32 are supported and fixed to valve holding sections of the shaft 5 by the insert molding. The connecting sections 31, 32 respectively have rectangular holes (fitting holes), to which the shaft 5 is fitted. The two connecting sections 31, 32 are formed integrally with the pair of side plates 33, 34 on the pin rod 4 side.

The pair of side plates 33, 34 are formed to extend straight from the two connecting sections 31, 32 outward in a radial direction of the pin rod 4 (i.e., toward free end side or toward tip end side). The side plates 33, 34 are formed by bending both ends of the valve plate 35 with respect to the rotational axis direction (i.e., axial direction parallel to pin rod 4) toward the shaft side (connecting section side) at substantially right angles.

The pair of side plates 33, 34 have inside surfaces arranged to face outside surfaces (facing wall surfaces) of the facing walls 23, 24 of the duct 1 across predetermined clearances (side clearances). The pair of side plates 33, 34 have outside surfaces arranged to face inside surfaces (facing wall surfaces) of the facing walls 27, 28 of the casing 2 across predetermined clearances (side clearances).

The valve plate 35 is a connecting portion connecting free ends of the pair of side plates 33, 34 (i.e., ends opposite to shaft side). The valve plate 35 reciprocates in the rotational direction centering on the rotational axis of the pin rod 4 along the downstream end surfaces of the duct right and left wall sections of the duct 1 outside the duct 1. Thus, the valve plate 35 changes the opening areas of the intake passages 21, 22.

The valve plate 35 has a curved surface section (arc section) having a cross-section in the shape of an arc arranged between the curve line sections of the facing walls 23, 24 of the duct 1 and the air outlet of the intake passage 21 across clearances.

A cut portion may be formed in a tip end portion of the curved surface section of the valve plate 35, the cut portion defining an opening section (restrictor) between the valve plate 35 and a passage wall surface (top wall surface) in the upper wall section of the duct 1 when the rotary valve 3 is closed fully. The opening section opens in the intake passage 21 on one side with respect to a height direction of the intake passage 21.

The opening section has a function to generate a gas fluidity (rotational flow, tumble flow) in the combustion chamber of each cylinder of the engine by restricting a passage cross-sectional area (opening area) of the intake passage 21 formed inside the duct 1 to a predetermined value or lower. The rotational flow (tumble flow) generated in the combustion chamber of each cylinder of the engine can be strengthened by reducing the opening area of the opening section.

Next, details of the casing 2 according to the present embodiment will be explained with reference to FIGS. 1 to 8B.

U-shaped accommodation recesses 10, 37, 38 are formed in an upper portion of the block 25 of the casing 2 shown in FIG. 1. The accommodation recesses 10, 37, 38 open to an outside along a radial direction of the pin rod 4 and extend from the opening side to a deeper side opposite to the opening side. The accommodation recesses 10, 37, 38 are axial holes (bearing holes) extending in the rotational axis direction (thrust direction) parallel to the pin rod 4.

Bottom portions blocking the deep sides of the accommodation recesses 10, 37, 38 are provided on the deep sides of the accommodation recesses 10, 37, 38. Concave curved surfaces having cross-sections in arc-like shapes with curvature radii centering on the pin rod 4 are formed on the bottom portions of the accommodation recesses 10, 37, 38.

The accommodation recess 10 is formed between the two adjacent accommodation recesses 37 (accommodation recesses 37 on center side), i.e., between the pair of facing sections 11, 12, to connect the adjacent accommodation recesses 37 such that the accommodation recess 10 partly surrounds the central portion of the pin rod 4 with respect to the rotational axis direction. The accommodation recess 10 rotatably accommodates the pin rod 4 and defines a shaft penetration hole, through which the pin rod 4 penetrates in the rotational axis direction.

A bent section (bottom section) having an arc-like cross-section (i.e., semicircular cross-section) with a curvature radius centering on the rotational axis of the pin rod 4 is formed on the deep side of the accommodation recess 10. A convex curved surface bent in an arc-like shape is formed on the bent section.

The bearing 14, the spring 15 and the first and second collars 16, 17 are accommodated in the accommodation recess 10. A hole diameter of the accommodation recess 10 is larger than hole diameters of the accommodation recesses 37, 38.

The multiple accommodation recesses 37 are formed in the upper portions of the block 25 in FIG. 1 corresponding to the ducts 1, the rotary valves 3 and the hollow sections. A pair of accommodation recesses 41, 42 for rotatably accommodating the two connecting sections 31, 32 provided to the rotary valve 3 are formed on both sides of each accommodation recess 37 with respect to the rotational axis direction. Hole diameters of the pair of accommodation recesses 41, 42 are larger than the hole diameters of the accommodation recesses 37.

Each of the multiple accommodation recesses 38 is formed between the two adjacent accommodation recesses 37 to connect the adjacent accommodation recesses 37. Each accommodation recess 38 rotatably accommodates the pin rod 4 and defines a shaft penetration hole, through which the pin rod 4 penetrates in the rotational axis direction. Hole diameters of the accommodation recesses 38 are larger than the hole diameters of the accommodation recesses 37.

Next, details of the pin rod 4 and the shaft 5 according to the present embodiment will be explained with reference to FIGS. 1 to 8B.

The pin rod 4 and the shaft 5 are arranged (accommodated) outside an outer surface of the upper wall section of the duct 1 such that the pin rod 4 and the shaft 5 penetrate through the insides of the multiple accommodation recesses 10, 37, 38 extending in the rotational axis direction parallel to the pin rod 4.

The pin rod 4 is arranged to extend straight in the rotational axis direction parallel to an arrangement direction of the multiple intake passages 21, 22 and the multiple hollow sections, i.e., a direction parallel to the cylinder arrangement direction of the engine.

The pin rod 4 is a polygonal cross-section shaft (rectangular steel shaft or metallic shaft: square bar), whose cross-section perpendicular to the rotational axis direction is formed in a polygonal shape such as a rectangular shape. The pin rod 4 is formed as an integral body from a metallic material.

An end portion of the pin rod 4 with respect to the rotational axis direction protrudes to an outside from end surfaces of the casing 2 and the shaft 5 and is connected to the actuator 7. The other end portion of the pin rod 4 protrudes to the outside from the other end surfaces of the casing 2 and the shaft 5 and is rotatably supported by a bearing 8 press-fitted and fixed to the casing 2. The other end portion of the pin rod 4 with respect to the rotational axis direction is cut to have a round cross-sectional shape.

The pin rod 4 can be connected to the multiple rotary valves 3 through the shaft 5 such that the pin rod 4 can move the rotary valves 3 in conjunction with each other. Thus, the openings of the multiple rotary valves 3 (valve openings of TCVs) can be changed collectively by the single pin rod 4.

The shaft 5 is a cylindrical rein member (i.e., resin mold section made of synthetic resin) arranged for the multiple rotary valves 3 correspondingly and formed to surround the periphery of the pin rod 4 in the circumferential direction. The pin rod 4 has valve holding sections connected with the connecting sections 31, 32 of the multiple rotary valves 3. The connecting sections 31, 32 are held and fixed by insert molding.

Two outer peripheral protrusions 43 (thick sections) are formed on an outer periphery of the central portion of the shaft 5 corresponding to the central portion of the pin rod 4 with respect to the rotational axis direction. The bearing support pipe 13 made of the metal material is formed on a small diameter section 44 (thin section) between the outer peripheral protrusions 43 by insert molding (outsert molding).

Next, details of the thrust restriction mechanism according to the present embodiment will be explained with reference to FIGS. 1 to 8B. The thrust restriction mechanism has the bearing support pipe 13, the bearing 14, the spring 15, the pair of facing sections 11, 12 and the first and second collars 16, 17.

The pair of first and second facing sections 11, 12 (annular supports) are formed integrally in the central portion of the upper portion of the block 25 of the casing 2 in FIG. 1. The facing sections 11, 12 have annular facing surfaces arranged to face each other across an axial distance (i.e., shaft accommodation recess 10) parallel to the rotational axis direction of the pin rod 4 and the shaft 5.

The pair of facing sections 11, 12 respectively have first and second penetration holes 45, 46, through which the pin rod 4 and the shaft 5 penetrate in the rotational axis direction thereof. An external diameter of the shaft 5 should be preferably smaller than hole diameters of the first and second penetration holes 45, 46. The shaft 5 may be fitted to the first and second penetration holes 45, 46 with clearances. In this case, increase of sliding resistance (sliding torque) in the rotational direction of the shaft 5 between the shaft 5 and the facing sections 11, 12 of the block 25 of the casing 2 can be inhibited.

Accordingly, failure of operation of the rotary valves 3 of the multiple TCVs and the pin rod 4 can be inhibited.

The bearing support pipe 13 has a round hole (fitting hole) fitted to the outer periphery of the central portion of the shaft 5.

The bearing 14 is a rolling bearing (ball bearing) having multiple steel balls 53 (rolling elements) and two lip seals. The steel balls 53 are slidably accommodated between two bearing rings of an inner ring 51 and an outer ring 52 and roll between orbital surfaces of the inner ring 51 and the outer ring 52. The two lip seals are fitted between the two bearing rings of the inner ring 51 and the outer ring 52 on both end sides of the steel balls 53 with respect to the rotational axis direction. The bearing 14 rotatably supports the central portions of the pin rod 4 and the shaft 5 with respect to the rotational axis direction by rolling friction of the steel balls 53.

The bearing 14 is interposed between an outer peripheral surface of the bearing support pipe 13 and a hole wall surface of the shaft accommodation recess 10 of the casing 2. The inner ring 51 of the bearing 14 is press-fitted and fixed to the outer periphery of the central portion of the shaft 5 between the pair of facing sections 11, 12, or more specifically to the outer periphery of the bearing support pipe 13. The outer ring 52 of the bearing 14 is press-fitted and fixed to the hole wall surface of the shaft accommodation recess 10.

The spring 15 is arranged between the facing section 11 out of the pair of facing sections 11, 12 and the bearing 14 to constitute a bearing pressing section (compression spring) for pressing the bearing 14 against the other facing section 12 out of the pair of facing sections 11, 12. The spring 15 is a coil-shaped spring arranged to spirally surround the peripheries of the central portions of the pin rod 4 and the shaft 5, or more specifically the periphery of the bearing support pipe 13. The spring 15 is accommodated between the facing section 11 and the bearing 14 in a state where the spring 15 is compressed in the rotational axis direction of the pin rod 4 and the shaft 5.

The spring 15 exerts a biasing force to extend toward both sides along the rotational axis direction (thrust direction) of the pin rod 4 and the shaft 5. That is, the spring 15 presses the bearing 14 against the facing section 12.

The first and second collars 16, 17 are arranged on both sides of the spring 15 to sandwich the spring 15.

The first collar 16 has a cylindrical section surrounding the periphery of the bearing support pipe 13 in the circumferential direction and a flange section extending from a left end portion of the cylindrical section in FIG. 1 into the shape of a flange. The cylindrical section of the first collar 16 maintains a coil internal diameter of the spring 15. The flange section of the first collar 16 defines a sliding surface (boundary surface) enabling the end portion of the spring 15 (left end portion in FIG. 1) to slide with respect to the facing section 11.

The second collar 17 has a cylindrical section surrounding the periphery of the bearing support pipe 13 in the circumferential direction and a flange section extending from a right end portion of the cylindrical section in FIG. 1 into the shape of a flange. The cylindrical section of the second collar 17 maintains the coil internal diameter of the spring 15. The flange section of the second collar 17 defines a sliding surface (boundary surface) enabling the other end portion of the spring 15 (right end portion in FIG. 1) to slide with respect to the inner ring 51 and the outer ring 52 of the bearing 14.

Operation of First Embodiment

Next, an operation of the air-intake apparatus (specifically, valve unit) of the internal combustion engine according to the present embodiment will be explained with reference to FIGS. 1 to 8B.

If an ignition switch is switched on (IG•ON), the ECU performs energization control of the motor of the electronic control throttle device and drives the ignition devices (e.g., ignition coils and spark plugs) and the fuel injection devices (e.g., electric fuel pump and injectors). Thus, the engine is operated. At that time, the intake valve opens from an exhaust stroke of a specific cylinder of the engine. If the specific cylinder enters an intake stroke in which the piston descends, negative pressure (i.e., pressure lower than atmospheric pressure) in the combustion chamber of the specific cylinder increases with the descent of the piston. Accordingly, the mixture gas is suctioned into the combustion chamber from the opened intake port.

When the engine is cold and small intake air quantity suffices, i.e., in an engine start or in idling, the ECU controls the electric power supplied to the motor, which drives the multiple rotary valves 3 through the pin rod 4 and the shaft 5. For example, the ECU energizes the motor. At that time, the multiple rotary valves 3 are driven in a valve closing operation direction with the use of drive torque of the motor. Therefore, the respective valve plates 35 of the multiple rotary valves 3 are closed. That is, each valve plate 35 is controlled into the fully-closing position (fully-closing state) in which the valve plate 35 is positioned between the downstream end face of the duct 1 and the air outlet of the intake passage 21 to face the downstream end face of the duct 1 and the air outlet of the intake passage 21 across clearances.

In this case, a most part of the intake air flowing out from the air outlet of the intake passage 21 formed in the duct 1 flows along the concave curved surface of the curved surface section of the valve plate 35 and passes through an opening (not shown) formed between the passage wall surface of the upper wall section of the duct 1 and the valve plate 35. The intake air passing through the opening is introduced into an upper layer portion of the intake port of the cylinder head from the air outlet of the intake passage 22 formed in the relay duct 26 of the casing 2 and flows along the top wall surface of the upper layer portion of the intake port. The airflow flowing along the top wall surface of the upper layer portion of the intake port is supplied into the combustion chamber from an intake valve hole (port opening) of the intake port. At that time, a rotational flow (tumble flow) is generated inside the combustion chamber of each cylinder of the engine. Therefore, a combustion efficiency in the combustion chamber during the engine start or the idling improves, whereby fuel consumption or emission can be improved (for example, HC can be reduced).

When the engine is warm and a large intake air quantity is necessary, i.e., during a normal operation of the engine, the ECU controls the electric power supplied to the motor, which drives the multiple rotary valves 3 through the pin rod 4. For example, the ECU energizes the motor. At that time, the multiple rotary valves 3 are driven in the valve opening operation direction by using the drive torque of the motor. Therefore, the respective valve plates 35 of the multiple rotary valves 3 are opened. That is, each valve plate 35 separates from the fully closing position where the valve plate 35 is positioned between the downstream end face of the duct 1 and the air outlet of the intake passage 21 to face the downstream end face of the duct 1 and the air outlet of the intake passage 21 across the clearances. Each valve plates 35 is controlled into the accommodation position (accommodation state, fully opening state) where the valve plate 35 opens up the intake passage 21 and the valve plate 35 is accommodated in the valve accommodation recess 29 formed between a block bottom wall section of the casing 2 and the lower wall section of the duct 1.

In this case, the airflow flowing from the intake passage 21 formed inside the duct 1 into the intake passage 22 formed inside the relay duct 26 passes straight through the intake passages 21, 22 and is introduced from the air outlet of the intake passage 22 of the relay passage 26 into the intake port of the cylinder head. The airflow passing through the intake port is supplied into the combustion chamber from the intake valve hole (port opening) of the intake port. At that time, the rotational flow (tumble flow) in the longitudinal direction does not occur inside the combustion chamber of each cylinder of the engine.

Effect of First Embodiment

As described above, in the TCV (valve unit) according to the present embodiment, the bearing 14 is interposed between the outer periphery of the central portion of the shaft 5 between the pair of facing sections 11, 12, or more specifically the outer peripheral surface of the bearing support pipe 13, and the hole wall surface of the shaft accommodation recess 10 formed in the upper portion of the block 25 of the casing 2 in FIG. 1. More specifically, the inner ring 51 of the bearing 14 is press-fitted and fixed to the outer periphery of the central portion of the shaft 5 between the pair of facing sections 11, 12, or more specifically the outer periphery of the bearing support pipe 13. The outer ring 52 of the bearing 14 is press-fitted and fixed to the hole wall surface of the shaft accommodation recess 10 of the casing 2.

The spring 15 for pressing the bearing 14 against the facing section 12 is arranged between the facing section 11 and the bearing 14. The spring 15 is accommodated between the bearing 14 and the facing section 11 in a state where the spring 15 is compressed in the rotational axis direction of the pin rod 4 and the shaft 5.

There is a case where the dimensional change occurs such that the clearance between the facing section 12 provided in the block 25 of the casing 2 and the bearing 14 fixed to the pin rod 4 increases because of the difference among the linear expansion coefficients of the duct 1, the casing 2 and the pin rod 4. Even in such the case, displacement of the pin rod 4 in the rotational axis direction (thrust direction) with respect to the duct 1 and the casing 2 can be inhibited since the spring 15 presses the bearing 14 against the facing section 12. Moreover, the backlash of the multiple rotary valves 3 and the pin rod 4 in the rotational axis direction (thrust direction) can be inhibited.

Thus, problems such as galling between the outside surfaces (facing wall surfaces) of the facing walls 23, 24 of the duct 1 and the inside surfaces of the side plates 33, 34 of each rotary valve 3 or galling or friction between the inside surfaces (facing wall surfaces) of the facing walls 27, 28 of the casing 2 and the outside surfaces of the side plates 33, 34 of the rotary valve 3 can be inhibited. Therefore, occurrence of wear or an abnormal noise between the outside surfaces of the facing walls 23, 24 of the duct 1 and the inside surfaces of the side plates 33, 34 of the rotary valve 3 can be inhibited. Also, occurrence of wear or an abnormal noise between the inside surfaces of the facing walls 27, 28 of the casing 2 and the outside surfaces of the side plates 33, 34 of the rotary valve 3 can be inhibited.

The displacement of the pin rod 4, which connects the multiple rotary valves 3 such that the rotary valves 3 can move in conjunction with each other, in the rotational axis direction (thrust direction) can be inhibited. Accordingly, the dimensional change of the clearances between the outside surfaces of the facing walls 23, 24 of the duct 1 and the inside surfaces of the side plates 33, 34 of each rotary valve 3 accompanying the temperature change can be reduced. Also, the dimensional change of the clearances between the inside surfaces of the facing walls 27, 28 of the casing 2 and the outside surfaces of the side plates 33, 34 of each rotary valve 3 accompanying the temperature change can be reduced.

Positioning of the pin rod 4 in the rotational axis direction (thrust direction) with respect to the duct 1 and the casing 2 can be performed accurately. Therefore, the clearances between the outside surfaces of the facing walls 23, 24 of the duct 1 and the inside surfaces of the side plates 33, 34 of each rotary valve 3 can be made suitable. Also, the clearances between the inside surfaces of the facing walls 27, 28 of the casing 2 and the outside surfaces of the side plates 33, 34 of each rotary valve 3 can be made suitable. Specifically, right side clearances and left side clearances (i.e., side clearances) formed among the outside surfaces of the facing walls 23, 24 of the duct 1, the inside surfaces of the facing walls 27, 28 of the casing 2 and the inside surfaces and the outside surfaces of the side plates 33, 34 of each rotary valve 3 can be equalized to each other.

Therefore, concerning the TCVs (valve units), variation among the flow rates of the leak air leaking from the circumferences of the rotary valves 3 can be reduced. Accordingly, generation of the rotational flows in the combustion chambers of the respective cylinders of the engine can be stabilized. As a result, aimed performance (effect to improve combustion efficiency of engine or effect to improve fuel consumption through stabilization of combustion) can be achieved.

An amount of the backlash of the rotary valves 3 in the rotational axis direction (thrust direction) tends to increase stepwise as a distance (axial distance parallel to rotational axis direction of pin rod 4) from the thrust restriction mechanism, which restricts the displacement of the pin rod 4 in the thrust direction with respect to the duct 1 and the casing 2, increases.

Therefore, in the present embodiment, the pair of facing sections 11, 12, the bearing support pipe 13, the bearing 14, the spring 15 and the first and second collars 16, 17 as the components constituting the thrust restriction mechanism are arranged near the central portion of the pin rod 4 with respect to the rotational axis direction. Accordingly, the amount of the backlash of the rotary valve 3, which is supported and fixed to the pin rod 4 at the position farthest from the thrust restriction mechanism, in the rotational axis direction (thrust direction) can be reduced as compared to the case where the thrust restriction section is provided on one end portion of the shaft 5 with respect to the rotational axis direction.

Second Embodiment

Figure 9:
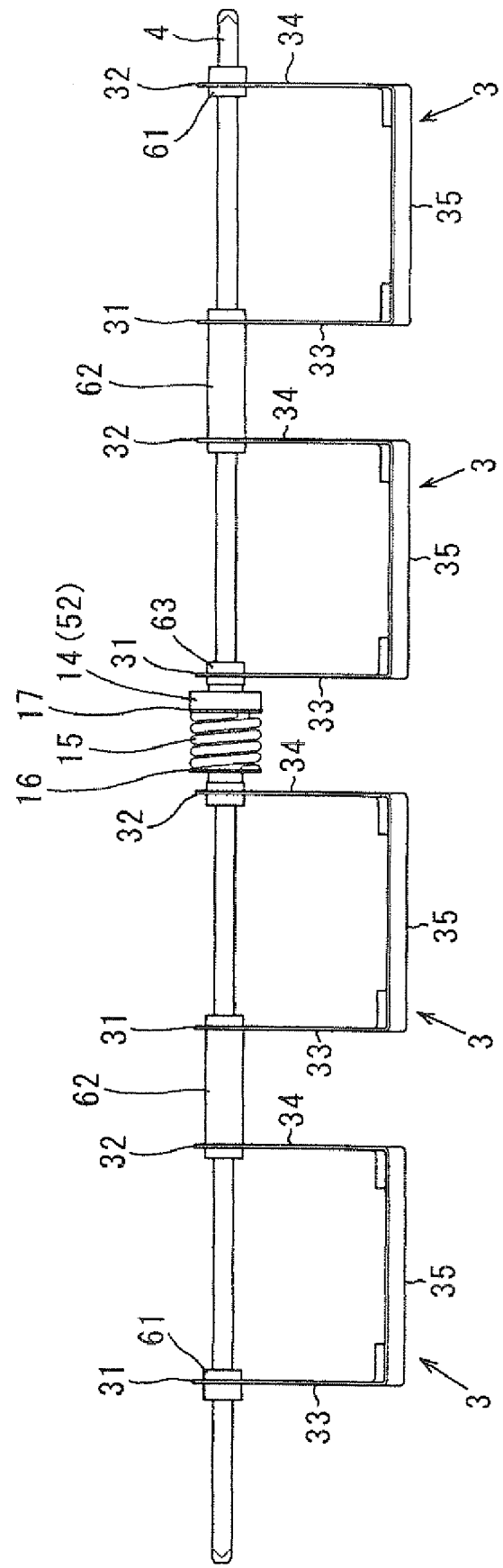
FIG. 9 is a front view showing a valve subassembly according to a second embodiment of the present invention.

FIG. 9 shows a valve subassembly according to a second embodiment of the present invention.

The valve subassembly according to the present embodiment has multiple rotary valves 3, a pin rod 4 (shaft) and multiple resin mold members 61, 62, 63. The rotary valves 3 are accommodated in multiple intake passages 21, 22 respectively such that the rotary valves 3 can open and close freely (rotate freely). The pin rod 4 has a polygonal cross-sectional shape and connects the rotary valves 3 such that the rotary valves 3 can move in conjunction with each other. The resin mold members 61-63 partly cover a periphery of the pin rod 4.

The two resin mold members 61 are arranged on both end portions of the pin rod 4 with respect to a rotational axis direction of the pin rod 4. The two resin mold members 61 constitute valve holding sections connected with connecting sections 31, 32 of outside side plates 33, 34 of the rotary valves 3 on the both end portions of the pin rod 4. The two resin mold members 61 are formed on outer peripheries of the both end portions of the pin rod 4 with respect to the rotational axis direction by insert molding (outsert molding).

The two resin mold members 62 constitute valve holding sections connected with connecting sections 31, 32 of side plates 33, 34 of the two adjacent rotary valves 3. The two resin mold members 62 are formed on the outer periphery of the pin rod 4 by the insert molding (outsert molding).

The single resin mold member 63 constitutes a valve holding section connected with connecting sections 31, 32 of side plates 33, 34 of the two adjacent rotary valves 3. The resin mold member 63 is formed on an outer periphery of a central portion of the pin rod 4 with respect to the rotational axis direction by insert molding (outsert molding). A thrust restriction mechanism is assembled to the single resin mold member 63. The thrust restriction mechanism consists of a bearing support pipe 13, a bearing 14, a spring 15 and first and second collars 16, 17. The bearing support pipe 13, the bearing 14, the spring 15 and the first and second collars 16, 17 are arranged between a pair of facing sections 11, 12 formed in an upper portion of a block 25 of a casing 2.

The TCVs (valve units) according to the present embodiment constructed as above can exert the same effects as the first embodiment.

Third Embodiment

Figure 10:
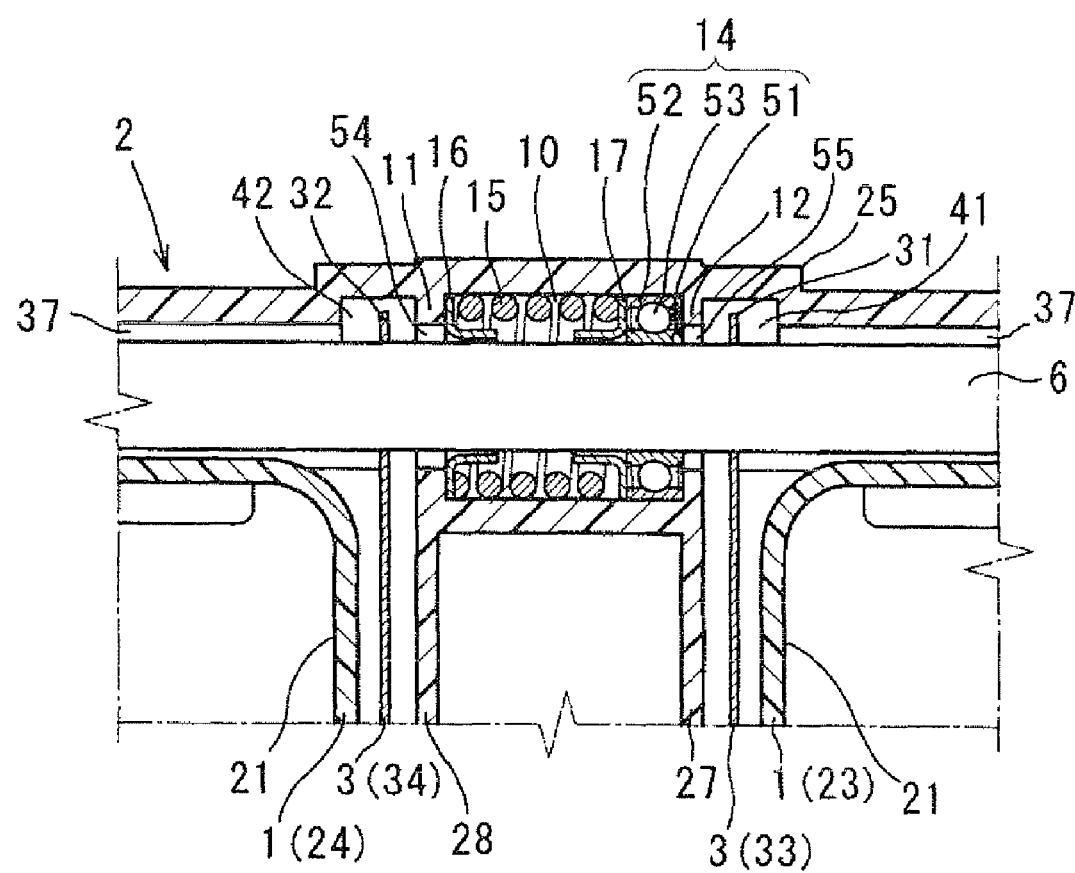
FIG. 10 is a partial cross-sectional view showing a bearing structure of an intake air flow control valve (TCV) according to a third embodiment of the present invention.
Figure 11:
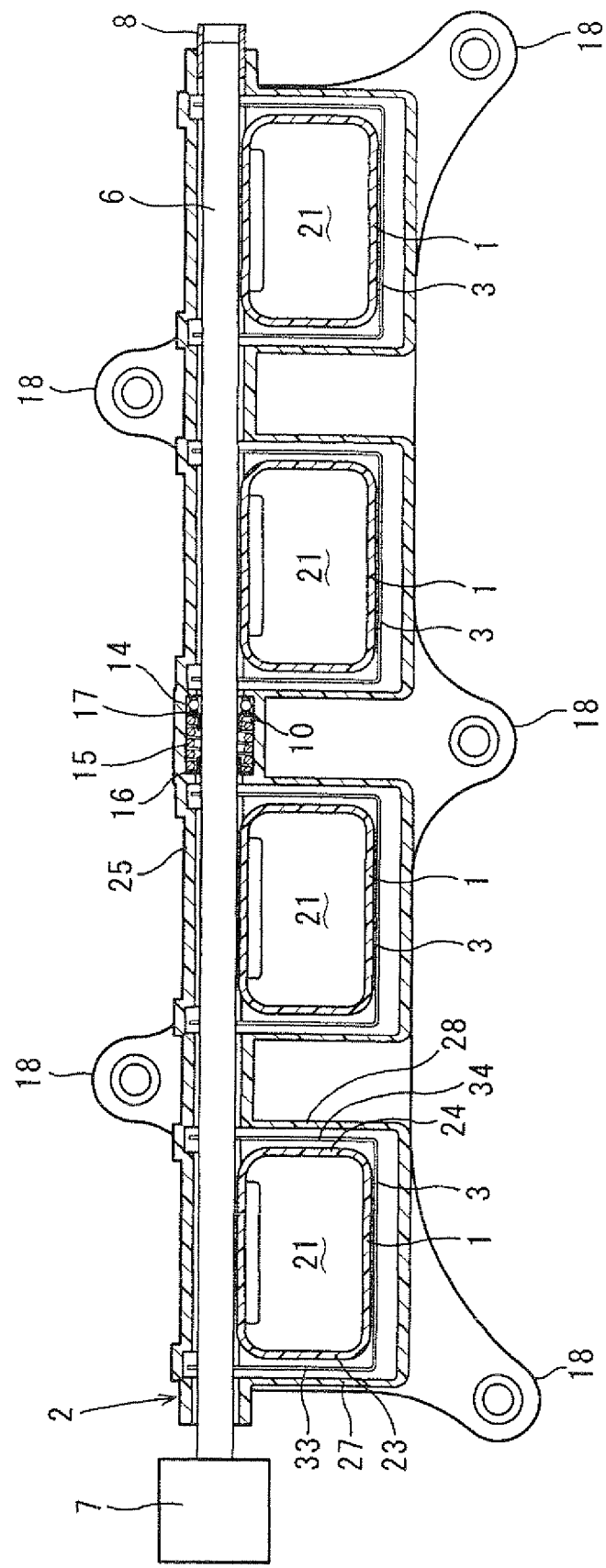
FIG. 11 is a cross-sectional view showing an entire structure of the intake air flow control valve (TCV) according to the third embodiment.
Figure 12:
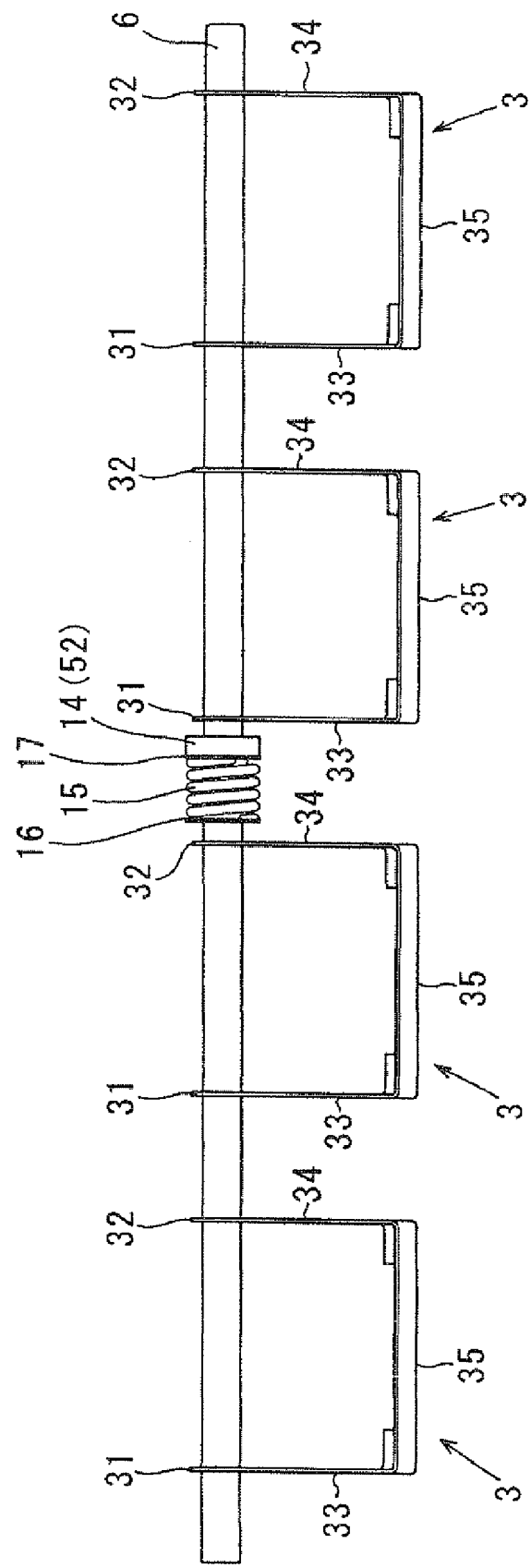
FIG. 12 is a front view showing a valve subassembly according to the third embodiment.
Figure 13A:
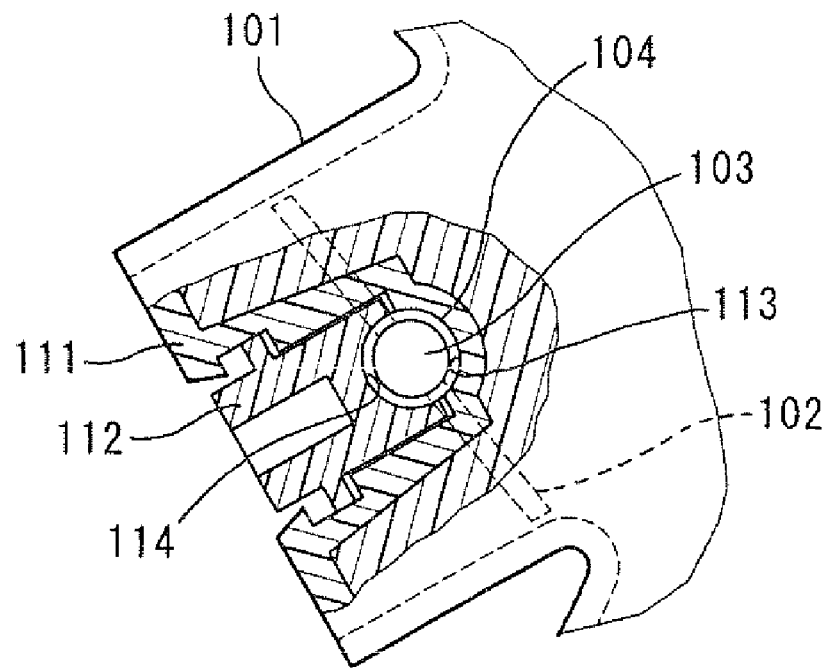
FIG. 13A is a partial cross-sectional view showing a shaft bushing structure of an intake air control valve of a prior art.
Figure 13B:
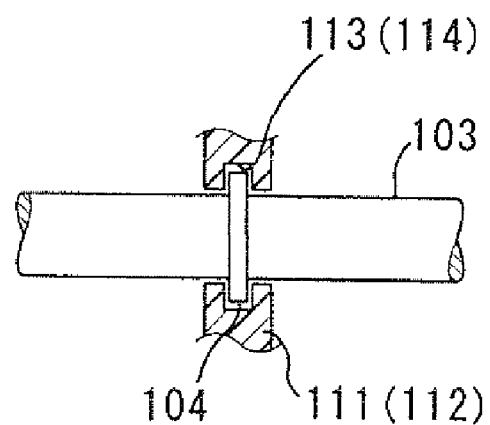
FIG. 13B is a partial cross-sectional diagram showing the shaft bushing structure of the prior art.

Next, a third embodiment of the present invention will be described with reference to FIGS. 10 to 12. FIG. 10 is a view showing a bearing structure of an intake air flow control valve (TCV) according to the third embodiment. FIG. 11 is a view showing an entire structure of the intake air flow control valve (TCV) according to the third embodiment. FIG. 12 is a view showing a valve subassembly according to the third embodiment.

The valve subassembly according to the present embodiment has multiple rotary valves 3 accommodated in multiple intake passages 21, 22 such that the rotary valves 3 can open and close freely (rotate freely) and a pin rod 6 (shaft) that has a polygonal cross-sectional shape and that connects the rotary valves 3 such that the rotary valves 3 can move in conjunction with each other.

Each of the rotary valves 3 according to the present embodiment has a pair of side plates 33, 34, which have two connecting section 31, 32 directly connected to the pin rod 6, and a valve plate 35 for changing an opening area of an air flow passage communicating with a combustion chamber of each cylinder of an engine.

The two connecting sections 31, 32 are metallic ring plates surrounding a periphery of the pin rod 6 and are fitted and fixed to respective valve holding sections of the pin rod 6. The connecting sections 31, 32 have round holes (fitting holes), to which the pin rod 6 is fitted.

The pin rod 6 according to the present embodiment is a round cross-section shaft (i.e., round steel shaft round bar), whose cross-section perpendicular to a rotational axis direction of the pin rod 6 is formed in a round shape. The pin rod 6 is formed as an integral body from a metallic material. The pin rod 6 has multiple valve holding sections connected with the connecting sections 31, 32 of the rotary valves 3. That is, the actuator 7 connects the rotary valves 3 through the pin rod 6 such that the rotary valves 3 can move in conjunction with each other. Thus, openings of the rotary valves 3 (valve openings of TCVs) can be collectively changed by the single pin rod 6.

A bearing support pipe 13, two outer peripheral protrusions 43 and a small diameter portion 44 are not formed in a central portion of the pin rod 6 with respect to the rotational axis direction.

A thrust restriction mechanism according to the present embodiment has a bearing 14, a spring 15, a pair of facing sections 11, 12 and two collars 16, 17.

The bearing 14 is interposed between an outer peripheral surface of the pin rod 6 and a hole wall surface of a shaft accommodation recess 10 of a casing 2. An inner ring 51 of the bearing 14 is press-fitted and fixed to an outer periphery of the central portion of the pin rod 6 with respect to the rotational axis direction between the pair of facing sections 11, 12 (i.e., bearing (inner ring) support section). An outer ring 52 of the bearing 14 is press-fitted and fixed to the hole wall surface of the shaft accommodation recess 10 (bearing (outer ring) support section) as in the first embodiment.

The spring 15 is arranged to spirally surround the periphery of the central portion of the pin rod 6. The spring 15 is accommodated between the bearing 14 and the facing section 11 in a state where the spring 15 is compressed in the rotational axis direction of the pin rod 6.

The pair of facing sections 11, 12 are arranged to face each other across an axial distance (i.e., shaft accommodation recess 10) parallel to the rotational axis direction of the pin rod 6.

The pair of facing sections 11, 12 have first and second penetration holes 54, 55, through which the pin rod 6 penetrates in the rotational axis direction. An outer diameter of the pin rod 6 should be preferably set smaller than hole diameters of the first and second penetration holes 54, 55. Alternatively, the pin rod 6 may be fitted into the penetration holes 54, 55 with clearances. In this case, increase of sliding resistance (sliding torque) between the pin rod 6 and the facing sections 11, 12 of a block 25 of the casing 2 in a rotational direction can be inhibited. Therefore, failure of operation of the rotary valves 3 of the TCVs and the pin rod 6 can be inhibited.

Thus, the valve units (TCVs) according to the present embodiment can exert the same effects as the first and second embodiments.

Modifications

In the above-described embodiments, the air-intake apparatus (intake air rotational flow generator) of the internal combustion engine according to the present invention is constructed to be able to generate the rotational flow (tumble flow) in the longitudinal direction for promoting the combustion of the mixture gas in the combustion chamber of each cylinder of the engine. Alternatively, the air-intake apparatus of the internal combustion engine according to the present invention may be constructed to be able to generate a rotational flow in a lateral direction (swirl flow) for promoting the combustion of the mixture gas in the combustion chamber of each cylinder of the engine. Alternatively, the air-intake apparatus of the internal combustion engine according to the present invention may be constructed to be able to generate a squish vortex for promoting the combustion in the engine.

In the above-described embodiments, the present invention is applied to the intake air rotational flow generator of the internal combustion engine. Alternatively, the present invention may be applied to an electronic control throttle device or an intake air variable device that varies passage length of an intake passage or an intake passage cross-sectional area of an internal combustion engine.

In the above-described embodiments, the actuator 7 for driving the multiple rotary valves 3 is constituted by the motor and the power transmission mechanism (such as gear reducer mechanism). Alternatively, the actuator for driving the multiple valves may be constituted by only a motor. A valve biasing section such as a spring for biasing the multiple valves in the valve-opening direction or the valve-closing direction may be provided or may be omitted.

In the above-described embodiments, the TCV (intake air flow control valve, tumble control valve) is used as the intake air control valve, which has the multiple valves accommodated in the multiple intake passages formed inside the casing such as the intake manifold (or intake duct) or an engine main body (cylinder head) such that the valves can open and close freely and which controls the intake air suctioned into the combustion chambers of the respective cylinders of the internal combustion engine. Alternatively, instead of the TCV, an intake air flow rate control valve for controlling intake air flow rates of the intake air suctioned into the combustion chambers of the respective cylinders of the internal combustion engine may be used.

In the above-described embodiments of the present invention, the actuator 7 for driving the multiple rotary valves 3 is constituted by the motor and the power transmission mechanism (such as gear reducer mechanism). Alternatively, the actuator for driving the multiple rotary valves may be constituted by a negative-pressure-operated actuator having an electromagnetic or electric negative pressure control valve.

In the above-described embodiments, the rotary valve 3 (or butterfly valve) in the U-shape having the angled corners is formed as the integral body from the metallic material. Alternatively, the rotary valve 3 (or butterfly valve) in the U-shape having the angled corners may be formed as an integral body from a resin material.

The present invention may be applied to a multiple unit integral type valve opening-closing device (intake passage opening-closing device), in which multiple valve units (TCVs) each constructed by building a single valve in a singe cartridge (housing) such that the valve can open and close freely are arranged inside an intake manifold as a casing at constant intervals along a rotational axis direction of a pin rod (shaft).

A diesel engine may be used as the internal combustion engine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An air-intake apparatus of an internal combustion engine having a plurality of cylinders, the air-intake apparatus comprising:
   a casing defining a plurality of intake passages for supplying intake air to the cylinders of the internal combustion engine respectively;
   a plurality of valves accommodated in the intake passages respectively such that the valves can open and close freely;
   a shaft for connecting the valves such that the valves can move in conjunction with each other; and
   a thrust restriction section for restricting displacement of the shaft in a rotational axis direction of the shaft, wherein
   the thrust restriction section has:
   a pair of facing sections arranged to face each other across an axial distance parallel to the rotational axis direction of the shaft;
   a rolling bearing having an inner ring fixed to an outer periphery of the shaft between the facing sections; and
   a bearing pressing section arranged between one of the pair of facing sections and the rolling bearing for pressing the rolling bearing against the other one of the pair of facing sections.

2. The air-intake apparatus as in claim 1, wherein
the casing has a U-shaped recess that opens outward in a radial direction of the shaft and that extends from the opening side to a deeper side opposite to the opening side.

3. The air-intake apparatus as in claim 2, wherein
the shaft is arranged such that the shaft penetrates through the recess in the rotational axis direction of the shaft.

4. The air-intake apparatus as in claim 1, wherein
the casing has a recess that extends in the rotational axis direction parallel to the shaft.

5. The air-intake apparatus as in claim 4, wherein
the shaft is arranged such that the shaft penetrates through the recess in the rotational axis direction of the shaft.

6. The air-intake apparatus as in claim 1, wherein
the bearing pressing section is a spring in the shape of a coil, and
the spring is accommodated between the one of the pair of facing sections and the rolling bearing in a state where the spring is compressed in the rotational axis direction of the shaft.

7. The air-intake apparatus as in claim 1, wherein
the rolling bearing has an outer ring fixed to a wall surface of the casing between the pair of facing sections.

8. The air-intake apparatus as in claim 7, wherein
the rolling bearing has a plurality of rolling elements that are accommodated between two bearing rings of the inner ring and the outer ring and that roll between orbital surfaces of the inner ring and the outer ring.

9. The air-intake apparatus as in claim 1, wherein
a cross-section of the shaft perpendicular to the rotational axis direction of the shaft is formed in a polygonal shape.

10. The air-intake apparatus as in claim 9, further comprising:
   a resin member arranged to surround a periphery of the shaft in a circumferential direction.

11. The air-intake apparatus as in claim 10, further comprising:
   a pipe that is provided on an outer peripheral portion of the resin member by insert molding and that is press-fitted with the inner ring.

12. The air-intake apparatus as in claim 1, wherein
the thrust restriction section has a first collar enabling the bearing pressing section to slide with respect to the one of the pair of facing sections and a second collar enabling the bearing pressing section to slide with respect to the rolling bearing.

13. The air-intake apparatus as in claim 1, wherein
a central portion of the shaft with respect to the rotational axis direction of the shaft is arranged between the pair of facing sections.

14. The air-intake apparatus as in claim 13, wherein
the inner ring of the roiling bearing is fixed to an outer periphery of the central portion of the shaft with respect to the rotational axis direction of the shaft.

15. The air-intake apparatus as in claim 13, wherein
the bearing pressing section is a spring in the shape of a coil, and
the spring is arranged to spirally surround the central portion of the shaft with respect to the rotational axis direction of the shaft.

* * * * *